United States Patent [19]

Paul et al.

[11] Patent Number: 5,426,579
[45] Date of Patent: Jun. 20, 1995

[54] METHOD AND APPARATUS FOR STABILIZING AC POWER SUPPLY SYSTEMS CONNECTED TO POWER FACTOR CORRECTING LOADS

[75] Inventors: Steven J. Paul, Tomah; Phillip A. Board, Necedah; Michael W. Hogan, New Lisbon, all of Wis.

[73] Assignee: Best Power Technology, Incorporated, Necedah, Wis.

[21] Appl. No.: 98,611

[22] Filed: Jul. 28, 1993

[51] Int. Cl.⁶ .............................................. H02M 7/06
[52] U.S. Cl. .................................... 363/126; 363/44; 363/81; 323/229; 323/299
[58] Field of Search ............... 323/207, 222, 229, 233, 323/299; 363/44–48, 53, 81, 84, 89, 126, 49; 361/91, 111

[56] References Cited

U.S. PATENT DOCUMENTS

| | | | |
|---|---|---|---|
| 4,015,171 | 3/1977 | Miller | 361/18 |
| 4,038,559 | 7/1977 | Chun et al. | 307/64 |
| 4,692,854 | 9/1987 | Baxter, Jr. et al. | 363/75 |
| 4,843,533 | 6/1989 | Roof et al. | 361/91 X |
| 4,998,098 | 3/1991 | Schweitzer, III | 361/91 X |
| 5,182,518 | 1/1993 | Stich et al. | 324/511 |

*Primary Examiner*—Brian K. Young
*Assistant Examiner*—Y. Jessica Han
*Attorney, Agent, or Firm*—Foley & Lardner

[57] ABSTRACT

Instabilities in the output voltage provided from an AC power supply system connected to a power factor correcting load are suppressed by a stabilizer which is connected across the output lines from the power supply system to the load. The stabilizing apparatus includes a rectifier having AC input nodes connected to the power supply system output lines, and DC output nodes at which DC voltage appears. A capacitor and resistor are connected in parallel across the output nodes of the rectifier. During normal operation, where the peak AC voltage from the power supply system is substantially constant, the capacitor charges up to a voltage level near the zero to peak value of the AC voltage waveform, with the charge on the capacitor slowly dissipated through the parallel resistor at a rate that does not substantially dissipate the charge between peaks of the AC voltage waveform. When changes in the peak value of the AC voltage waveform from steady state occur, the capacitor clamps the voltage across the output lines at a value near the steady state peak value to damp out oscillations in voltage level and reduce the effect of positive feedback caused, for example, by interaction between the power factor correcting load and the leakage inductance of the output winding of a transformer in the power supply system. A damping resistor may be connected in parallel with the capacitor during start-up of the load, or whenever excessive voltage changes occur, to provide more rapid damping of the voltage oscillations.

36 Claims, 7 Drawing Sheets

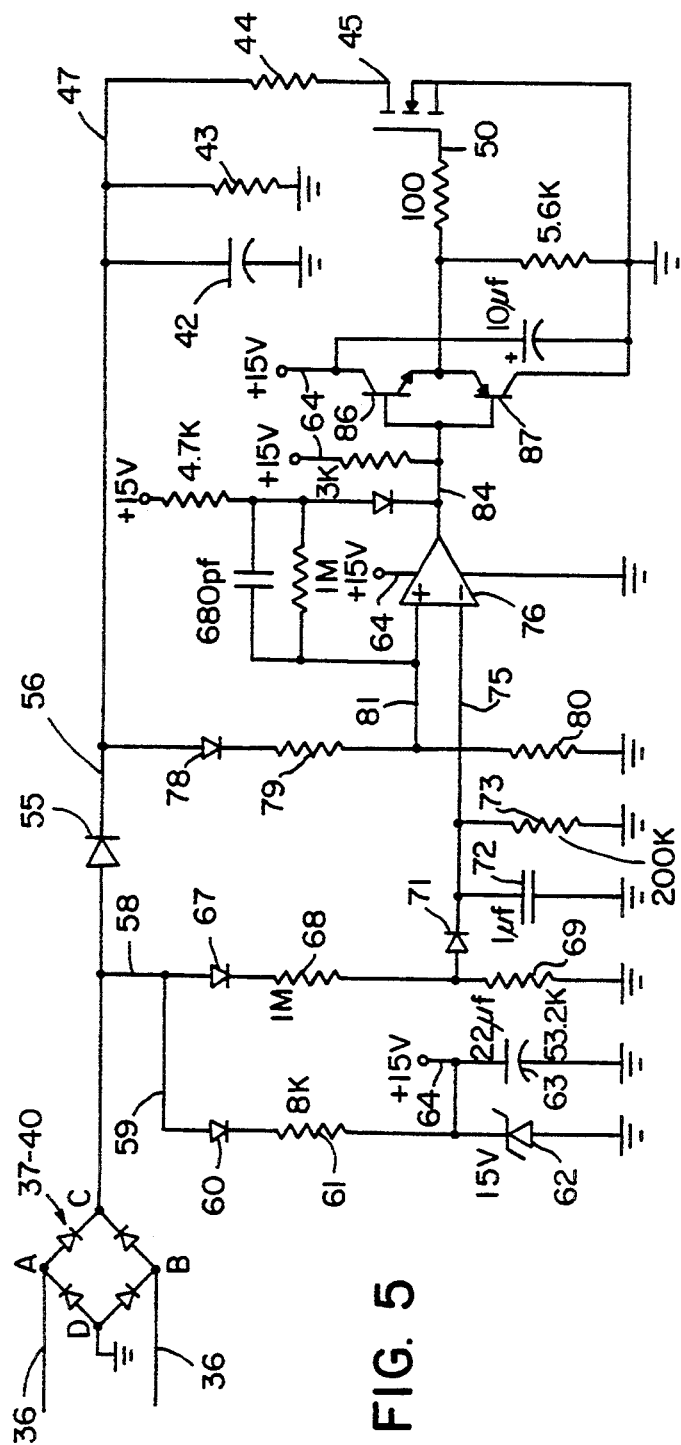
FIG. 5
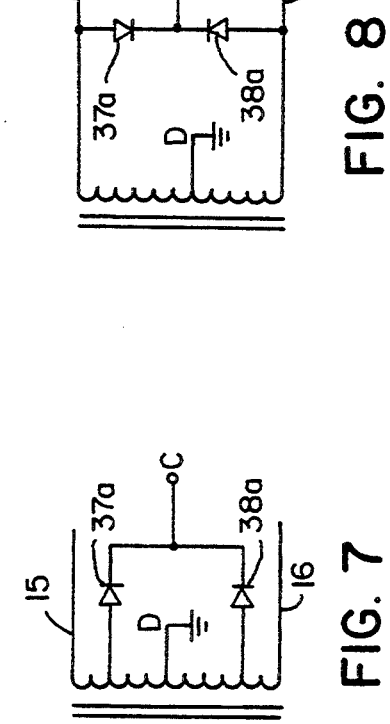
FIG. 8
FIG. 7
FIG. 6

METHOD AND APPARATUS FOR STABILIZING AC POWER SUPPLY SYSTEMS CONNECTED TO POWER FACTOR CORRECTING LOADS

FIELD OF THE INVENTION

This invention pertains generally to the field of electrical and electronic power supplies, and particularly to the stabilization of uninterruptible power supplies, transformers and the like which are connected to loads having power factor correction circuits.

BACKGROUND OF THE INVENTION

In recent years, the internal power supplies of computers and other electrical and electronic equipment have become smaller, of lower weight, and less costly. In many cases, such power supplies have been designed so that they do not require a transformer. Equipment incorporating a power supply without a transformer typically has an input circuit consisting of an input bridge rectifier which produces direct current from the alternating current (AC) input power. Such bridge circuits typically employ a capacitive input filter. Unfortunately, the capacitive input filter and the rectifier circuit present a poor power factor load which is reflected back to the AC power lines.

Recently, computers and other products having transformerless internal power supplies have been introduced which include power factor correction circuits; these circuits change the capacitive power factor of the transformerless power supply of such equipment to approximately unity power factor. While these power factor correcting circuits thus have reduced the power factor problems of equipment having transformerless power supplies, they have in turn introduced a new set of problems, particularly where the power factor corrected load is not connected directly to the AC power mains but is supplied with power through an intermediate AC power supply system. These power supply systems can include linear transformers used for isolation or voltage change, ferroresonant transformers, uninterruptible and standby power supplies, DC to AC inverters, line conditioners, as well as AC generators and the like. Uninterruptible power supplies (UPS), standby power supplies (SPS), and line conditioners are now widely used to protect the power supplied to critical loads, such as computers, emergency lighting, fluorescent lamp ballasts, other electronic ballasts, and the like, which commonly use transformerless power supplies. It has been found that when load equipment which incorporates a power factor correcting circuit is connected to receive power from these AC power supply systems, instability manifested as an oscillation in the output voltage provided to the load may occur. Particularly affected are UPSs and SPSs which employ voltage regulation with feedback, either electronic or magnetic, which is derived either directly or indirectly from the output terminals. Also affected are other AC power supply systems including those which have voltage regulation or which use a ferroresonant transformer or a linear transformer with high leakage reactance in the power supply path.

Interaction between the peak currents demanded by the power factor correcting load with the voltage regulation circuitry of a UPS or SPS, or with the reactive characteristics of a transformer, can create an unstable situation in which positive feedback can produce undesirable and wide fluctuation of the amplitude of the voltage and current supplied to the power factor corrected load. The power factor correcting equipment demands current in the form of pulses which supply the energy lost by the capacitive filter to the load, and also creates a simulated current which is sinusoidal in shape and is in phase with the applied voltage. These pulses generate an additional voltage drop across the leakage reactance of the transformer. When the demand for current ceases, the voltage regulator action or the collapsing magnetic field within the transformer induces an increasing transient voltage at the output. This increasing transient voltage causes an increase of current into the filter capacitor of the power factor correcting load, triggering the action of the power factor correcting circuit and causing it to demand "correcting" current. This current causes voltage drop across the output of the regulated power supply or the transformer leakage reactance, and the cycle repeats itself. This can result in an undesirable cyclic oscillation of the AC voltage and current peaks (an amplitude modulation of the 60 Hz sinusoidal power) which, once initiated, can be difficult to stop.

Such oscillations can also occur where power is supplied from the AC power mains to a power factor correcting load through a ferroresonant or linear transformer which is not part of a voltage regulated power supply. Ferroresonant transformers, by design, have a higher leakage reactance than linear transformers, and thus in certain cases can be particularly sensitive to the effects of power factor correcting loads. Even linear transformers which have a significant leakage reactance can be similarly affected, to various degrees, depending upon the transformer design and the magnitude of the leakage reactance.

Various solutions have been sought to the instability problem. Where a transformer contributes to the problem, one approach is to substitute larger, higher power transformers, as well as different designs for the transformers. Larger transformers, which have lower leakage reactance, can minimize the problem, but are more expensive, heavier, and occupy more space than a transformer which would be properly sized to service the load if the instability problem were not present.

SUMMARY OF THE INVENTION

In accordance with the present invention, a stabilizing apparatus is provided for the output of AC power supply systems, such as uninterruptible power supplies, standby power supplies, line conditioners, transformers, or transformer based power supplies, which suppresses the tendency of the output of the AC power supply system to oscillate when it is connected to a power factor correcting load. The apparatus consumes a very small amount of power and is adapted to be connected to existing power supply systems and loads. The apparatus operates by managing the output power from the AC power supply system in a way which, given the characteristics of power factor correcting loads, avoids positive feedback interaction of the power factor correcting load with the power supply system. This is accomplished by limiting rapid changes in the peak to peak voltage provided from the AC power supply system to the load.

The stabilizer of the invention is connected in parallel across the output lines from the AC power supply system to the load. The stabilizer includes a rectifier, such as diodes connected in a bridge configuration, which is connected at its AC input nodes across the power supply system output lines, which are also connected to the power factor correcting load. The DC output nodes of the bridge are connected to a controlled power dissipation circuit, such as a paralleled capacitor and resistor. During normal supply of AC output power across the output lines, this main capacitor becomes charged up to essentially the peak of the output voltage waveform, with the resistor in parallel with the capacitor determining the rate of decay of the charge on the capacitor. Only a small amount of current flows into the stabilizer during normal operation at times near the peaks of the AC waveform, and very little energy is dissipated in the stabilizer. If the power factor correcting load begins to cause oscillations in the output voltage, so that the peak output voltage increases beyond the normal peak output voltage, the stabilizer clamps the output voltage at substantially the peak value and diverts the additional current provided by the power supply system through the capacitor and the parallel connected dissipating resistor. Consequently, a positive feedback interaction with the power factor correcting load is avoided. For regulated power supply systems which do not contain a transformer, the stabilizer adds sufficient loading and clamping to eliminate the voltage excursions which are caused by the interaction between the demand for voltage regulation and for current regulation at the same node, eliminating the mechanism which initiates the oscillation. If oscillation has begun, adequate damping is automatically supplied to stop the oscillatory activity.

Under certain conditions, such as during start-up, the power factor correcting load is charging its internal power supply capacitors and additional energy is drawn from the AC power supply system connected to it. Under such non-normal conditions, additional power dissipation may be required to avoid instability. To provide additional damping under these circumstances, an auxiliary damping resistor may be switched into the circuit in parallel with the main capacitor to more rapidly discharge the capacitor during each cycle, and to dissipate more of the energy in the circuit which would otherwise drive oscillations in the output voltage amplitude. Once the transient condition has ceased, the additional damping resistor may be switched out of the circuit to allow normal operation with minimal power loss. The damping resistor may also be switched into and out of the circuit in a pulse width modulated manner to allow close selection of the amount of energy dissipation desired.

Generally, it is preferred that the power dissipation capacitor and resistor be sized so that the resistor dissipates approximately 1% of the rated output load power of the AC power supply system to which the stabilizer is connected, and that the capacitor have a capacitance selected to match the rated load. The minimum required capacitance of the capacitor is determined by the voltage regulation characteristics of the power supply system, its output time constants, and the time constants of the power factor corrected load. For a power supply system which employs a transformer in its output, the size of the capacitor is affected by the leakage reactance of the transformer, the coupling factors and the magnitude of the tank capacitance in a ferroresonant transformer, as well as the characteristics of the load. The value of the capacitance can be selected empirically to match particular UPS, SPS, line conditioner or transformer systems and loads.

The stabilizer of the invention can also improve the stability of AC power supply systems where the cause of the instability is not a power factor corrected load. For example, the stabilizer can be used to stabilize the output of a square-wave, constant voltage ferroresonant transformer when operated with no load or a very light load. The stabilizer also enables a ferroresonant UPS to provide stable power to another ferroresonant transformer powered load. The stabilizer can also be used to improve the stability of three phase ferroresonant systems.

Further objects, features and advantages of the invention will be apparent from the following detailed description when taken in conjunction with the accompanying drawings.

BRIEF DESCRIPTION OF THE DRAWINGS

In the drawings:

FIG. 5 is a schematic circuit diagram of a peak voltage change detection circuit for the stabilizer.

FIGS. 6–8 are simplified circuit diagrams of alternative transformer connections for the stabilizer.

DETAILED DESCRIPTION OF THE INVENTION

Figure 1:
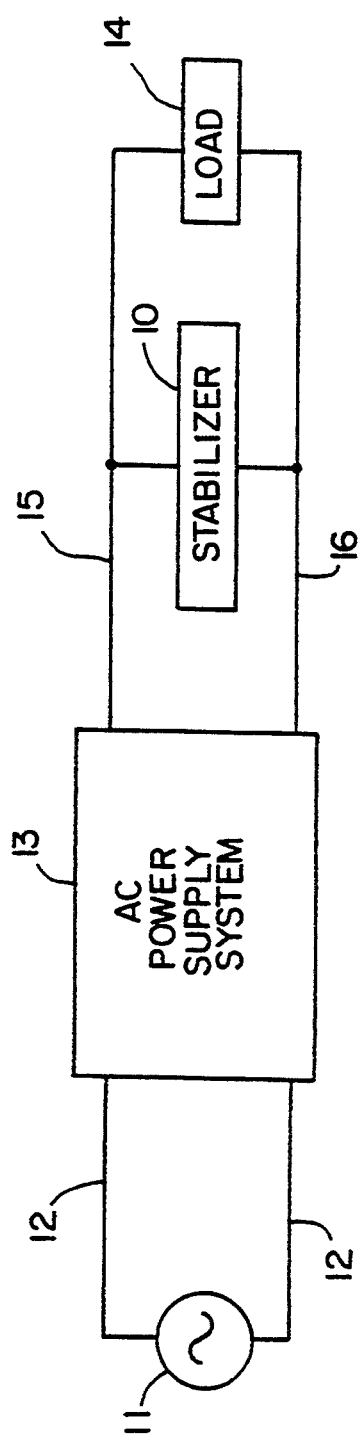
FIG. 1 is a block diagram illustrating the use of the stabilizing apparatus of the invention in conjunction with an AC power supply system and a power factor correcting load.

For purposes of exemplifying the application of the present invention, a stabilizer 10 in accordance with the invention is shown in FIG. 1 connected in an electrical distribution system in which power from a main power source is provided on lines 12 to an AC power supply system 13. The AC power supply system 13 supplies power to a load 14 on its output lines 15 and 16. The stabilizer 10 is connected across the output lines 15 and 16 in parallel with the load 14. Typically, the main source 11 is a utility power grid which characteristically has very low output impedance. If the load 14 were connected directly to the output lines 12 of the main source 11, the actions of the load 14, even if a power factor correcting load, would have little effect upon the voltage on the lines 12. However, it is becoming increasingly common for electrical power to be distributed within a building through a local AC power supply system (generally identified at 13 in FIG. 1 for purposes of illustration) which, at least in some circumstances, may have a significant output impedance or other characteristic which causes it to interact with a power factor correcting load 14. Such AC power supply systems can include linear transformers used for voltage step-up or step-down or for isolation, ferroresonant transformers, uninterruptible power supplies (UPS), standby power supplies (SPS), motor-generator sets, line inductors, line conditioners, and voltage regulated AC power supplies. The AC power supply system 13 can also include systems in which the power source 11 is not a utility power grid, but is a local power source, e.g., alternators driven by an internal combustion engine, wind power generators, DC to AC inverters supplied from a DC power source such as a battery, and so forth. UPS and SPS typically provide power from a battery to the load when power on the utility mains fails. Thus, the output impedance of a UPS or SPS will generally be higher when it is operating on battery power than when utility power is present, and many UPS and SPS attempt to regulate the output voltage provided to the load when operating on battery power.

The output characteristics of these various types of AC power supply systems can lead to instability when such systems are connected to power factor correcting loads. Power factor correcting circuits have been incorporated in power supplies of consuming equipment, such as computers, fluorescent lamps, emergency lighting systems, and other electronic ballasts, and in equipment which itself is intended to be part of the electrical distribution system, e.g., power factor corrected UPS, SPS, and stand alone power supplies. Some types of loads which do not incorporate power factor correction circuits, such as ferroresonant transformers, have also been observed to cause instabilities under some circumstances.

The stabilizer 10 of the present invention serves to eliminate or minimize instabilities in the output power from the supply system 13 which are otherwise manifested as oscillations in the peak to peak output voltage. The stabilizer 10 does so by limiting rapid charges in peak to peak output voltage from the power system 13 while adapting to long term changes in the output voltage.

Figure 2:
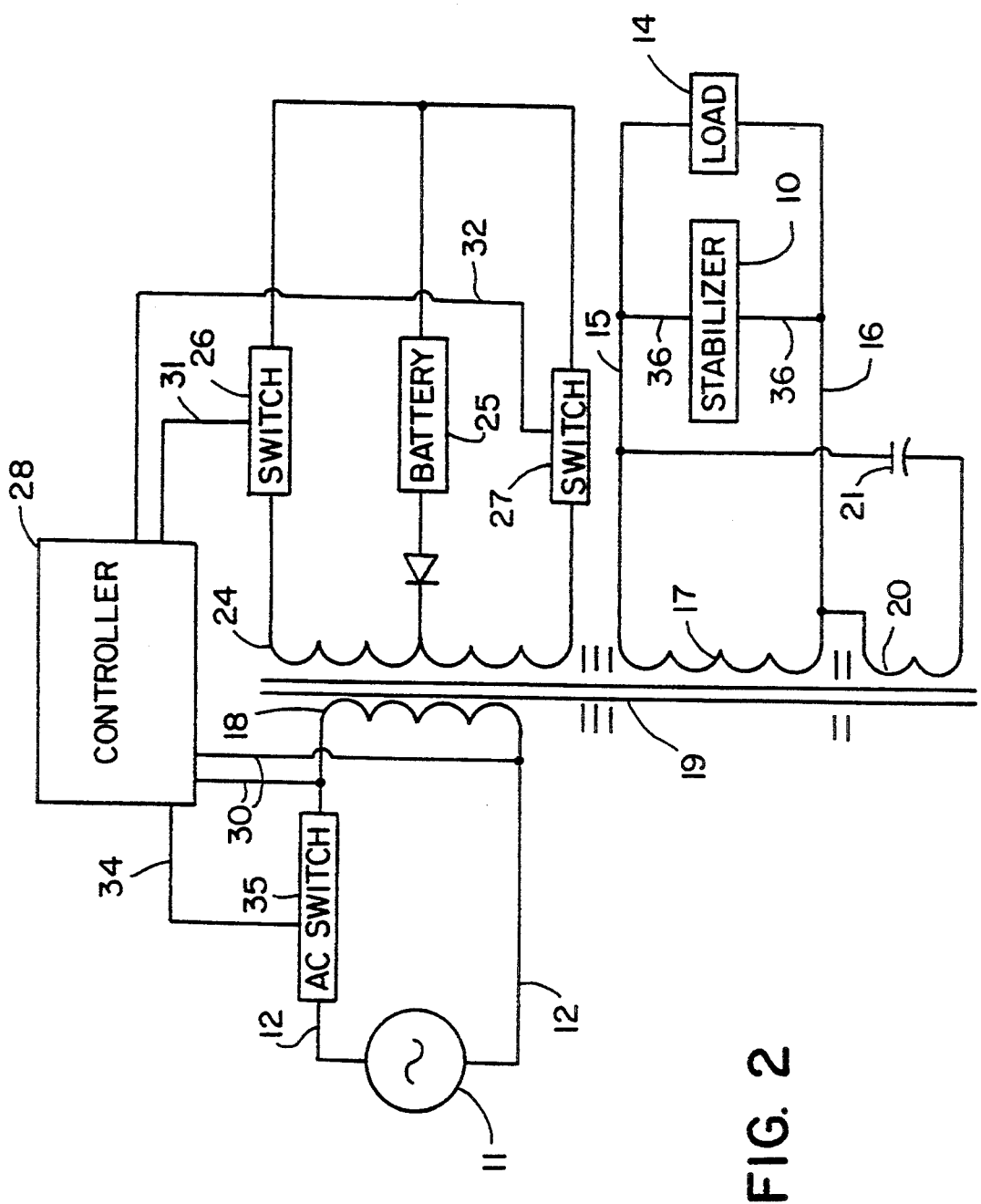
FIG. 2 is a schematic circuit diagram of an exemplary UPS system having a ferroresonant transformer to which the stabilizer of the present invention is connected.

A specific application of the stabilizer 10 is shown in FIG. 2 in conjunction with an uninterruptible power supply (UPS) which receives AC power from a utility power source 11 at input lines 12 and delivers power to a load 14. The exemplary UPS includes a ferroresonant transformer having a primary input winding 18, a core 19, a secondary winding 17 which supplies power on output lines 15 and 16 to the load 14, an additional ferroresonant transformer output winding 20 in series with the winding 17, and a capacitor 21 connected across the windings 17 and 20. To provide power to the load 14 during failure of power from the primary power source 11, an auxiliary primary winding 24 is connected to receive power from a battery 25 through an inverter comprised of switches 26 and 27, the switching of which is controlled by a controller 28. The controller 28 is connected by sensing lines 30 to the power from the AC power source 11 on the input terminals 12 to allow failure of the AC power source to be detected. Upon failure of the main AC power, the controller 28 provides control signals on lines 31 and 32 to the switching devices 26 and 27 to switch them in a desired manner to provide AC power on the auxiliary primary 24 from the battery 25 which is transferred across the ferroresonant transformer to the load 14. The controller also provides a control signal on a line 34 to an AC switch 35 to isolate the AC power source 11 from the UPS until normal supply of power is resumed and the supply of power from the battery 25 is discontinued.

The foregoing ferroresonant UPS is described for exemplification only, inasmuch as the present invention may be utilized with any AC power supply system which may require stabilization, including other UPS systems which have a transformer in the primary power path (including linear transformers as well as ferroresonant transformers), voltage regulated UPS systems which do not have a transformer, line conditioners, and other power distribution systems using a transformer with high leakage reactance. The control of inverters in UPS systems is well known, and any suitable controller may be utilized. An example of a UPS with which the present invention may be utilized is shown and described in U.S. Pat. No. 5,182,518, the disclosure of which is incorporated herein by reference.

An output stabilizer 10 in accordance with the present invention is connected across the output lines 15 and 16 from the transformer secondary 17, and is in parallel with the load 14. The stabilizer 10 inhibits positive feedback which may occur between the output of the winding 17 of the transformer and a power factor correcting load 14 which would otherwise cause oscillations.

Figure 3:
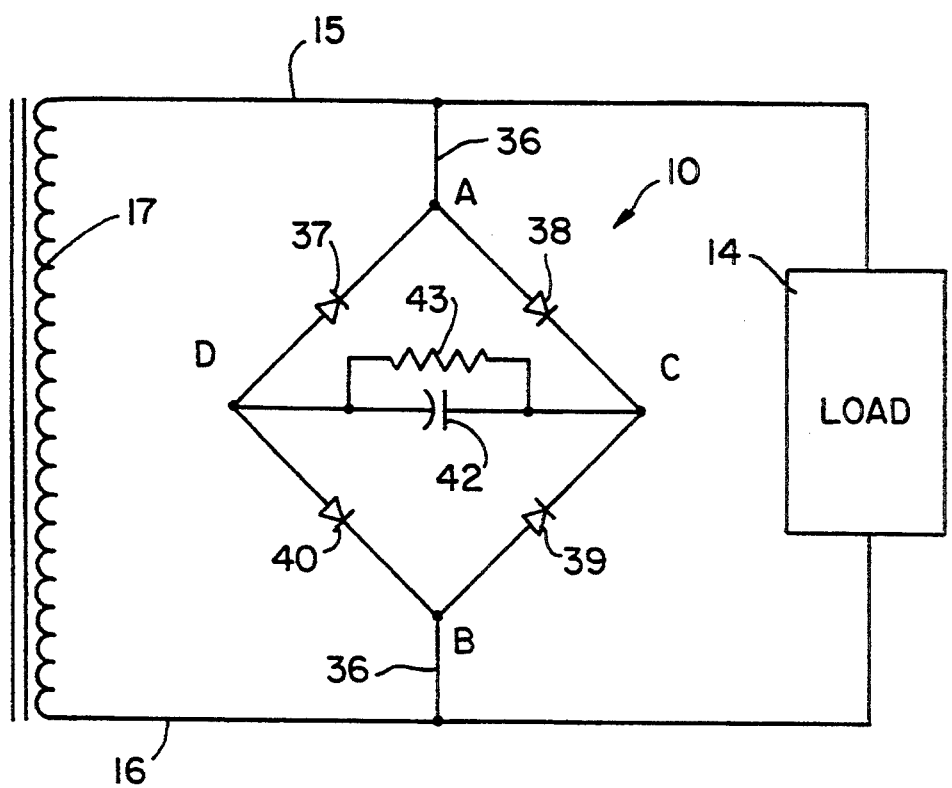
FIG. 3 is a schematic circuit diagram of the stabilizer apparatus of the present invention shown connected between the transformer output of the UPS and the load.

A circuit schematic of the basic output stabilizer 10 is shown in FIG. 3 connected between the output lines 15 and 16. The stabilizer has two lines 36, connected to the output lines 15 and 16, which provide AC power to two AC input nodes, labeled A and B in FIG. 3, of a full wave rectifier comprised of a bridge of diodes 37, 38, 39, and 40. The DC output nodes of the bridge are labeled D and C in FIG. 3. The bridge rectifies the AC input voltage to provide a full wave rectified DC output voltage between the nodes C and D. A controlled power dissipation circuit composed of a main capacitor 42 and a main damping resistor 43, connected in parallel with each other, is connected across the output nodes C and D. The diodes 37–40 may be semiconductor diodes which can readily be selected to provide the necessary power rating for the expected load.

During normal operation when the output voltage is stable, the waveform of the voltage across the output lines 15 and 16 is substantially sinusoidal with nearly equal positive and negative peaks. As the voltage across the lines 15 and 16 is full wave rectified and applied to the paralleled capacitor 42 and resistor 43, the capacitor 42 is rapidly charged up to nearly the zero to peak value of the voltage across the output lines 15 and 16. The resistor 43 is chosen to provide a desired time constant for the discharge of the capacitor 42, and generally is selected to be high enough in resistance to provide a discharge time constant which is substantially longer than the time between peaks in a single cycle of a 60 Hz waveform. Thus, during normal operation, the voltage across the capacitor 42 remains at substantially the zero to peak voltage during the time between one peak and the next peak of the full wave rectified voltage appearing across the nodes C and D. Under normal circumstances, where the output voltage across the lines 15 and 16 is substantially constant in peak magnitude, the capacitor 42 back biases the diodes 37–40 at essentially all times except for a short period of time around the peak of each half cycle. Consequently, during such normal operation, very little energy is dissipated in the paralleled capacitor 42 and resistor 43, and the capacitor 42, because it is being charged for only a small part of each cycle, adds only a small amount of effective capacitive power factor to the load as seen by the main power system.

If the power factor correcting load 14 begins to interact with the leakage inductance of the output winding 17 of the transformer, the output voltage from the transformer across the lines 15 and 16 may rapidly increase as the leakage inductance attempts to maintain the current level flowing to the load 14. The result can be an increasing peak value of the voltage across the output lines 15 and 16. However, any voltage across the output lines 15 and 16 which exceeds the voltage on the capacitor 42 will cause the diodes 37-39 to conduct, diverting sufficient current through the capacitor 42 to clamp the voltage across the output lines 15 and 16 at substantially the capacitor voltage. If the capacitor 42 is relatively large, the voltage across the capacitor 42 will increase relatively little during each cycle of charging.

Figure 4:
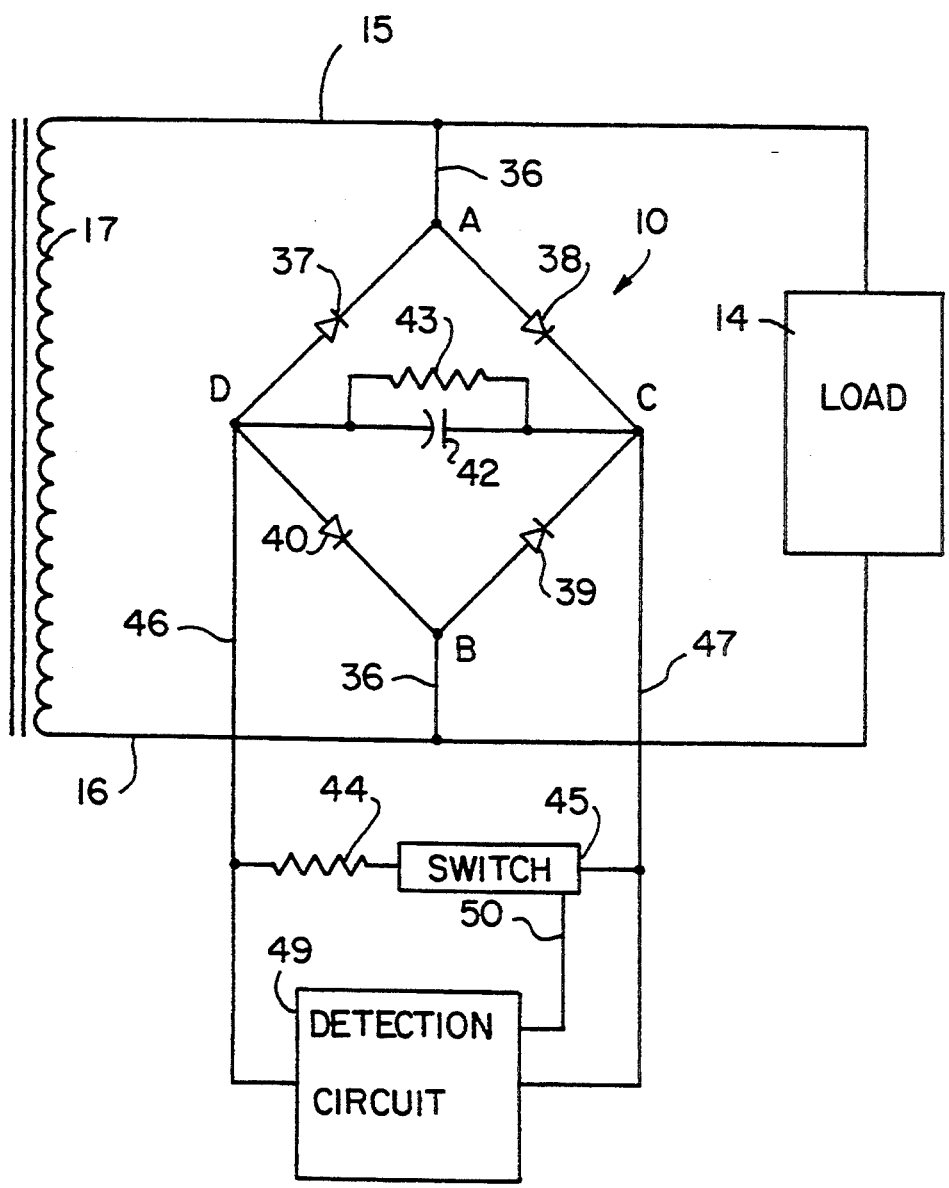
FIG. 4 is a schematic circuit diagram of a stabilizer apparatus of the invention which actively responds to peak output voltage changes.

During initial start-up of the power factor correcting load 14, additional current may be drawn by the load to charge up its internal capacitors (not shown). Relatively large output current may consequently be built up in the output winding 17 during startup. The leakage inductance of the transformer may then induce an excess voltage across the output lines 15 and 16 which the power factor correcting load 14 may attempt to compensate for, resulting in oscillations upon start-up that may exceed the capacity of the stabilizing apparatus 10 of FIG. 3. In addition, under some transient conditions in addition to start-up, the power factor correcting load may induce oscillations on the output lines 15 and 16 which cannot be entirely damped by the stabilizer 10 using only the energy dissipation provided by the main capacitor 42 and main damping resistor 43. To provide additional damping under such circumstances, as shown in FIG. 4, the stabilizer 10 preferably also includes a series connected auxilliary damping resistor 44 and controllable switch 45 connected by conducting lines 46 and 47 across the nodes C and D. A detection circuit 49 which detects changes in the peak AC voltage from a steady state level is also connected to the lines 46 and 47 to monitor the voltage across these lines. When the detection circuit 49 detects a voltage change indicative of an instability, such as when the voltage across the nodes C and D exceeds a steady state level and an oscillation is occurring which cannot be controlled, the detection circuit 49 provides an output signal on a line 50 to close the switch 45 and bring the auxilliary damping resistor 44 into the circuit in parallel with the resistor 43 and the capacitor 42. The additional resistor 44 provides, in combination with the resistor 43, a lower resistance discharge path for the capacitor 42 than the resistor 43 provides by itself. Consequently, the capacitor 42 is more rapidly discharged between half cycles so that more of the current from the transformer secondary 17 can be diverted away from the power factor correcting load, thereby more rapidly damping the oscillations. After the oscillations have been damped out, the detection circuit 49 may apply a control signal on the line 50 to open the switch 45 and resume normal operation of the stabilizer.

Preferably, the resistor 43 will dissipate approximately 1% of the rated load power of the AC power supply system 13 where the capacitor 42 is (in microfarads) equal to or greater than the rated load, expressed in volt-amperes, times a factor between 0.3 and 1.87. For example, the minimum capacitor for a 1,000 VA load may be 1,000×0.87, or 870 μF. The minimum capacitance required to provide adequate damping of oscillations is also a function of the leakage reactance of the output of the transformer, the coupling factors in a ferroresonant transformer, and the magnitude of the ferroresonant tank capacitance. The actual required minimum capacitance value may be determined empirically for the AC power supply system having a particular transformer, or for a UPS system, etc., and the rated load. Generally, if the capacitor, in microfarads, is less than 0.3 times the load rating in VA, it has been found that adequate stability for both linear and ferroresonant transformers may not be achieved if the leakage reactance exceeds one microhenry.

The controllable switch 45 may comprise normally open relay contacts, or a solid state switch such as a power FET. The detection circuit examines the output voltage from the AC power supply system 13, and can, for example, measure the peaks. If consecutive peaks vary from one to another by greater than a prescribed amount, the existence of an oscillation can be determined, and the detection circuit 49 can operate the switch 45 to switch in the auxilliary resistor 44.

A circuit schematic for a controlled power dissipation circuit is shown in FIG. 5 which includes an exemplary detection circuit 49. The switch 45 may be a power FET as shown in FIG. 5, wherein the control signal is provided on the line 50 to the gate of the FET. In this circuit, a diode 55 isolates the voltage at the output node C of the diode bridge and passes the positive voltage pulses on an output line 56 which extends to the main capacitor 42 and the main damping resistor 43, as well as to the auxiliary damping resistor 44. The voltage at the node C, which is unfiltered and thus has a large ripple, is passed on lines 58 and 59 to a power supply circuit consisting of a diode 60, a resistor 61, a zener diode 62, and a capacitor 63 connected in parallel with the zener diode 62. The zener diode 62 is selected to have a breakdown voltage at a desired output voltage level, e.g., 15 volts, which thus regulates the level of voltage supplied on a line 64 to other portions of the isolation detection circuit 49.

The voltage on the line 58 is also passed through a diode 67 to a voltage divider composed of resistors 68 and 69. The ripple voltage from the node C as divided by the voltage divider formed of the resistors 68 and 69 is passed through a diode 71 to charge a reference capacitor 72 having a resistor 73 in parallel therewith. The diode 71 prevents leakage of the charge on the capacitor 72 back into the resistor 69. The circuit is preferably constructed so that the reference capacitor 72 has a relatively rapid charging time constant (e.g., 40 milliseconds) and a much longer discharge time constant (e.g., 400 milliseconds). The voltage across the reference capacitor 72 provides a dynamic reference voltage level which reestablishes itself when the output voltage of the transformer changes average amplitude, and provides a steady state voltage reference. The reference voltage from the capacitor 72 is provided on a line 75 to one input of a comparator 76. The voltage on the line 56 is provided through a diode 78 to a voltage divider composed of resistors 79 and 80. The voltage on the line 56, which is essentially the voltage across the main capacitor 42, is divided by the voltage divider composed of the resistors 79 and 80 and provided on a line 81 to the positive input of the comparator 76. Because of the relatively low output impedance of the bridge rectifier, the capacitor 42 responds virtually immediately to a change in the peak to peak voltage of the output of the transformer on the output lines 18 and 19, rapidly charging up to a new peak level on every cycle (although to a peak voltage level less than the peak voltage that would be provided from the power supply system if the stabilizer were not present). The values of the resistors 79 and 80 are selected so that the divided peak voltage applied on the line 81 to the comparator is approximately equal to the established reference voltage within the deadband of the comparator (less than 100 millivolts). Since the time constants for charging and discharging of the reference capacitor 72 are relatively long (e.g., 40 and 400 milliseconds, respectively), typically much longer than the time between peaks of a 60 Hz waveform (8.33 milliseconds between peaks), the voltage on the capacitor 72 (which is provided on a line 75 one input of the comparator 76) will change much more slowly, either in charge or discharge, than the voltage across the main capacitor 42 (which is provided on the line 81 to the other input of the comparator 76).

If the power factor corrected load causes an oscillatory condition, such that the peak to peak value of the output of the transformer begins to change relatively rapidly, the voltage across the main capacitor 42 will quickly reflect this change in peak voltage. This will result in a difference between the voltages on the lines 81 and 75 sufficient to cause the comparator 76 to change state at its output line 84. The output on the line 84 is provided to the bases of driver amplifier transistors 86 and 87. The output of the driver transistors 86 and 87 is provided on the line 50 to the gate of the power FET 45. The FET 45 is then turned on, bringing the resistor 44 into the circuit in parallel with the resistor 43 to provide the additional resistive dissipation needed to damp the oscillation. If the amplitude of the oscillation is small, only a small amount of power is dissipated in the resistor 44 before the oscillation is suppressed. When the oscillation ceases, the comparator 76 switches back to its first state, and the FET 45 is turned off to take the resistor 44 out of the circuit.

Preferably, the resistor 43 is sized to represent approximately 1% of the rated load of the UPS, as expressed in volt-amperes, so that the stabilizer consumes only a small amount of power under normal conditions. Preferably, the auxiliary clamping resistor 44 is selected to consume approximately 15% of the rated load, assuming shorting of the FET switch 45. In operation, when oscillations are detected, it has been found that the resistor 44 will consume approximately 1% to 3% of the rated VA load, depending on the amplitude of the oscillation that is detected.

Although the stabilizer 10 has been described above connected between the output lines 15 and 16, there are also other suitable configurations. For example, as illustrated in FIG. 6, the secondary 17 of the transformer may have intermediate taps to which the bridge supply lines 36 are connected. Such a connection may be utilized where a relatively high voltage level output is provided from the transformer secondary, e.g., a 480 volt RMS system. Where a transformer with taps is utilized, the capacitor 42 generally is increased in capacitance by the tapped turn ratio to the full transformer output turn ratio, but with the voltage rating of the capacitor comensurately being reduced. A tightly coupled step-down transformer may be utilized to supply the stabilizer for certain relatively light load applications. Another alternative is shown in FIG. 7 wherein the transformer is center tapped, and the function of the full bridge of diodes is served by two diodes 37a and 38a, with the D node now being the center tap of the transformer. A further alternative configuration is shown in FIG. 8 in which two diodes 37a and 38a are connected to the output lines 15 and 16 of the secondary of the transformer.

Although a full wave rectifier has been described above for exemplification, the stabilizer of the invention also provides stabilization with half wave rectification, i.e., utilizing a single diode, such as the diode 55 of FIG. 5. The utilization of half wave rectification, rather than full wave rectification, reduces the damping ability of the stabilizer circuit but may be suitable in certain circumstances.

Figure 9:
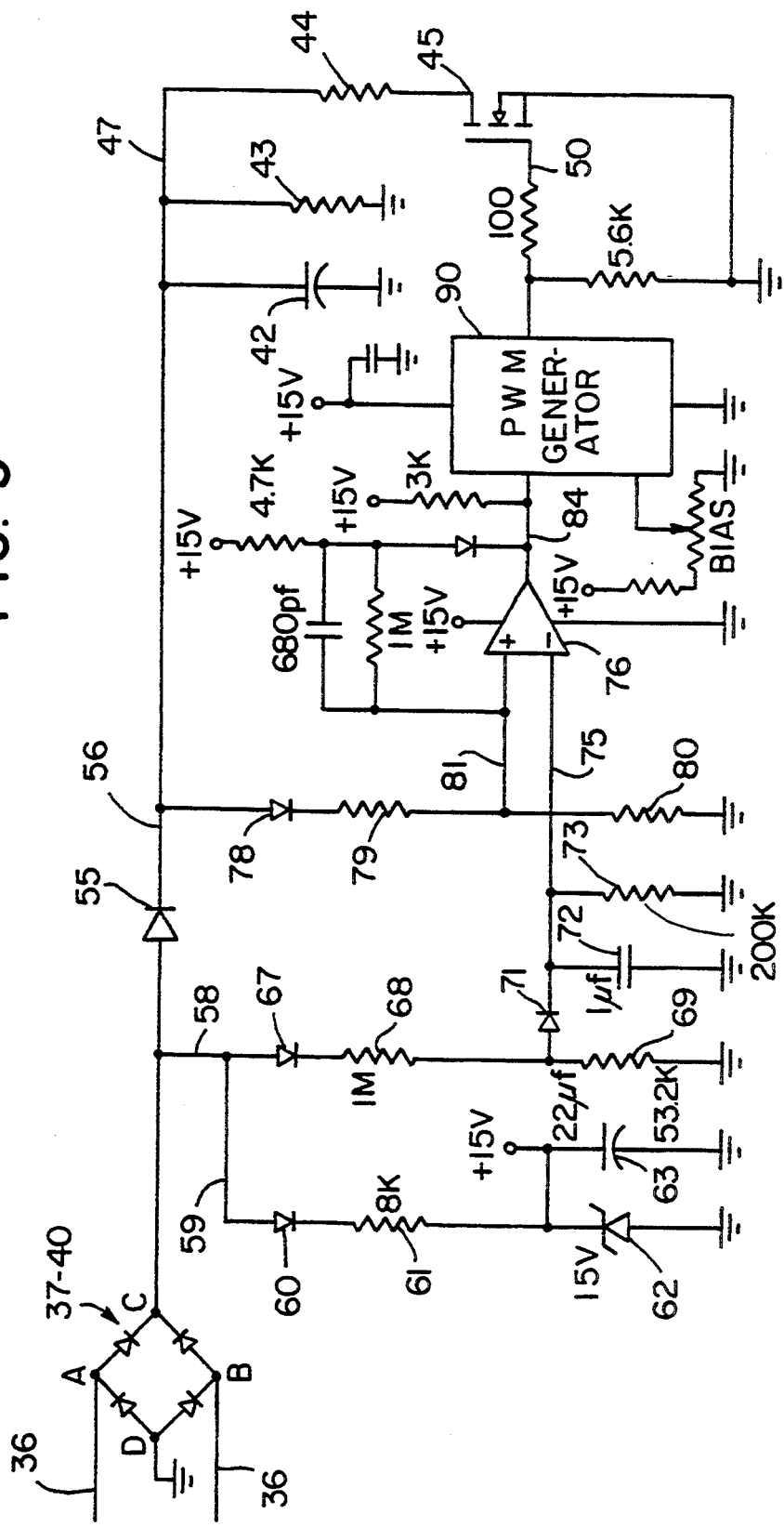
FIG. 9 is a schematic circuit diagram of a stabilizer having a detection circuit utilizing a pulse width modulator.

As illustrated in FIG. 9, a pulse width modulator 90 may replace the bipolar driver transistors 86 and 87. The pulse width modulator 90 may be arranged to provide a pulse output signal on the line 50 during normal operation that has a first selected pulse width so as to drive the FET 45 to turn on to dissipate power through the resistor 44 at a selected constant rate. This rate of dissipation may be selected so that the resistor 43 can be eliminated altogether, with the resistor 44 now also serving the function of slowly discharging the capacitor 42 under normal operating conditions. When the comparator 76 changes state to provide an output signal on the line 84, indicating the presence of oscillations, the pulse width modulator 90 may provide a second, wider output pulse width signal to the FET 45 so that current flows through the resistor 44 for longer periods of time.

Figure 10:
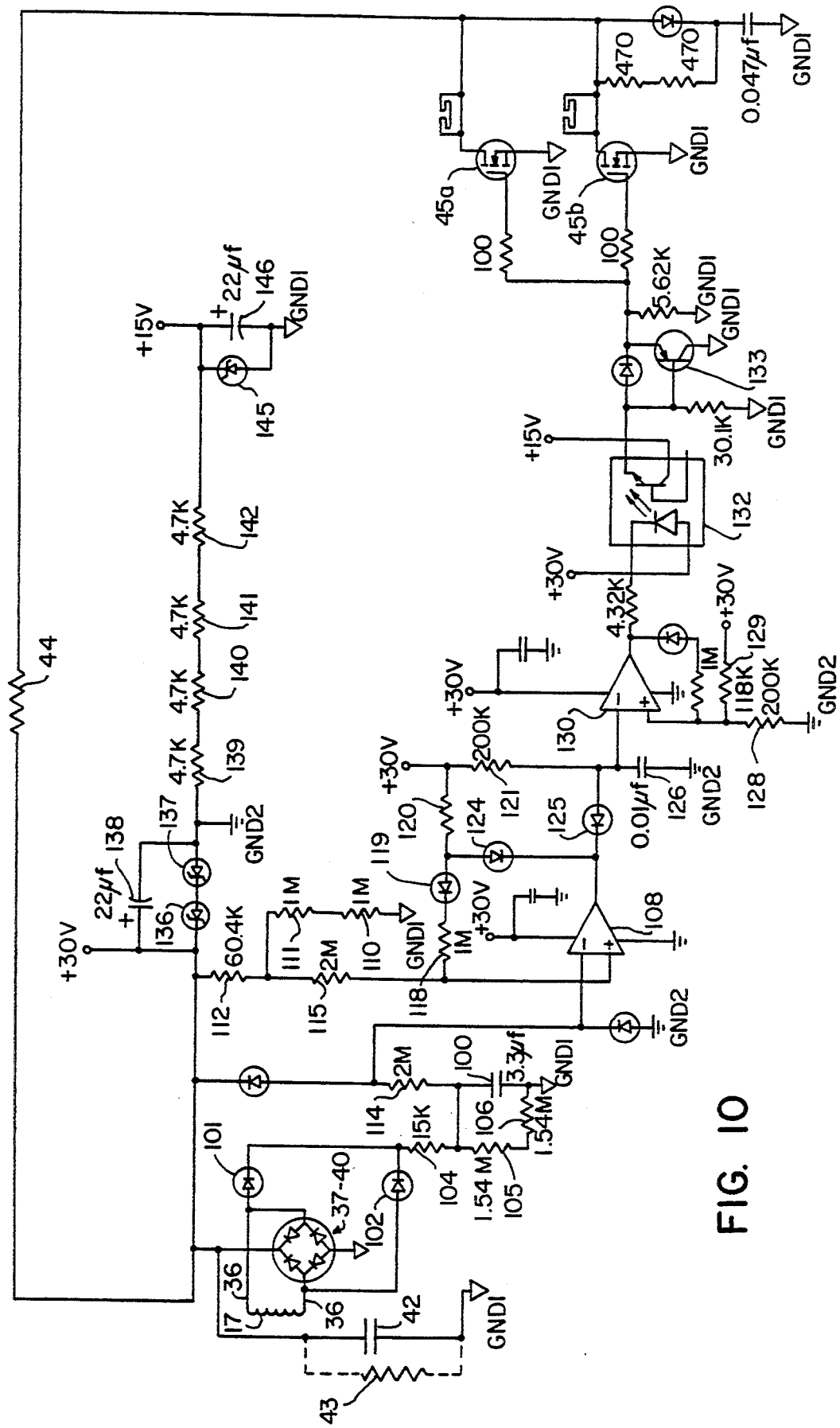
FIG. 10 is a schematic circuit diagram of a further embodiment of a stabilizer having a detection circuit.

A further preferred circuit for detecting changes in the peak AC voltage from the steady state, indicative of oscillations in the output, is shown in FIG. 10. This circuit is connected to the transformer's secondary 17 in parallel with the load. As in the circuits described above, regulation is performed by allowing the ferroresonant transformer to charge the large capacitor 42 through the bridge rectifier of diodes 37–40. As discussed above, the capacitor 42 charging current causes a voltage drop across the output impedance of the transformer secondary 17. This voltage drop appears as a flat-topped clipping of the secondary output voltage sine-wave, since the capacitor charging current flows only at the sine wave peaks, due to the rectifier, and the fact that the capacitor is never fully discharged. By controlling the charge on the capacitor, the phase angle at which the flat-topping starts and ends can be controlled. A peak-to-peak regulation is accomplished by clipping potentially excessive peaks so they cannot exceed a reference amplitude.

The reference amplitude is established by charging a reference capacitor 100 via diodes 101 and 102, and resistors 104, 105 and 106. The charge on the reference capacitor 100 provides a historical sample of the amplitude of the preceding peaks, and changes only slowly, since the charge and discharge time constants of the capacitor 100 and resistors 104–106 are long, compared to the time between AC waveform peaks at the transformer's operating frequency. If the magnitude of the peaks increases for several cycles, then the reference capacitor 100 gradually becomes charged to a higher voltage, thus reflecting the increase in the peaks; if the peaks decrease for several cycles, the capacitor 100 discharges through the resistors 105 and 106 until its charge level is sustained by the lower peaks, thus reflecting the voltage level of the lower peaks.

The historical sample reference voltage on the reference capacitor 100 is compared, in a comparator 108, to the voltage across the large main capacitor 42, which is sampled by a divider formed of resistors 110–112. Resistors 114 and 115 are buffer resistors connected to the inputs of the comparator 108. If the present voltage peak causes the charge on the large main capacitor 42 to exceed the charge on the reference capacitor 100 slightly, the comparator 108 output becomes an open collector. This allows positive feedback to the comparator's non-inverting input via resistor 118, diode 119, and resistor 120 and diode 124, providing hysteresis to prevent the comparator 108 from oscillating, and establishes a set point below which the large main capacitor 42 will need to be discharged to reset the comparator 108.

Another capacitor 126 now charges through a resistor 121 until it reaches the reference voltage established by a voltage divider composed of resistors 128 and 129. At this time, a comparator 130 has its output go to a ground level voltage. This occurs at a selected time period (e.g., about 2 milliseconds) after the main capacitor 42 has received its charge from the sine wave peak.

The change of state of the comparator 130 activates an optoisolator/level shifter 132 and an associated bipolar transistor 133, turning on the MOSFETS 45A and 45B. This puts the damping resistor 44 in parallel with the main capacitor 42. The main capacitor 42 discharges through the resistor 44 until its voltage reaches the set-point at the non-inverting input of the comparator 108, causing its output to go to the comparator ground level, discharging the capacitor 126, and causing the output of the comparator 130 to become an open collector; this turns off the optoisolator 132 and the MOSFETS 45a and 45b, and removes the damping resistor 44 from the circuit so that it is no longer in parallel with the capacitor 42.

The delay provided by the comparator 130 allows the sine wave to go beyond its peak and decrease to a point where the bridge diodes 37–40 are reverse-biased, so the resistor 44 when connected in parallel with large capacitor 42 will not also be switched across the line, thus preventing needless dissipation in the resistor near the voltage peak.

The large capacitor 42 is now discharged sufficiently to clip the next voltage peak, if that peak should exceed the reference voltage on the reference capacitor 100. This charge/discharge of the main capacitor 42 will continue to clip and regulate the voltage peaks as long as the large capacitor peak charge exceeds the reference; if the peaks are tending toward a new, higher, steady-state value, the main capacitor's charge will eventually stop exceeding the reference. The resistor 44 will no longer be switched across the main capacitor at this point, because it will not be necessary to clip the peaks.

If the peaks are tending toward a new lower steady-state value, the reference capacitor 100 will discharge gradually through resistors 105 and 106; this may cause the voltage on the main capacitor 42 to exceed the reference voltage on the reference capacitor 100 since that voltage is decreasing. The comparators will then switch in the resistor 44 and discharge the main capacitor 42 until its voltage reflects an adjustment to the new, lower, steady-state peaks, at which time the resistor 44 will be switched out again, and the main capacitor 42 again will be able to charge to any new peaks that just begin to exceed the reference voltage level on the capacitor 100, and thus regulate the increase in those peaks. In this manner, only the damping resistor 44 need be connected in parallel with the main capacitor 44, and only when needed to provide energy dissipation. Of course, another resistor 43 may be connected in parallel with the capacitor 42 to provide continuous damping if desired.

If the changes in the peaks are not tending toward a new steady-state value, but are periodically (or momentarily) changing, perhaps due to a slight oscillation, then the circuit will continually adapt to reflect this fact, and will switch the resistor 44 in and out, as necessary, to maintain a relatively constant, long-term, peak voltage at the transformer's output. Diodes 136 and 137, a capacitor 138, and resistors 139–142 provide a 30 volt power supply, referenced to the peak charge on the main capacitor 42, to power the comparators. The comparison is done on the high-side, or positive voltage end of the main capacitor 42 and the reference capacitor 100. This allows a better signal-to-noise ratio, as the comparator detects a change in the voltage peaks, and thus allows a more responsive circuit which produces tighter regulation of the voltage peaks. The alternative method of referencing the circuit to the negative voltage end of the capacitors would require dividing the capacitor's high voltage down to a voltage low enough to fit the range of the low-voltage comparator IC. This division of the signal causes a lower signal-to-noise ratio, and requires higher precision, more expensive, harder-to-obtain parts to achieve an acceptable response and regulation. A zener diode 145, a capacitor 146, and the resistors 139–141 form a 15 volt power supply to provide gate drive to the MOSFETS.

Figure 11:
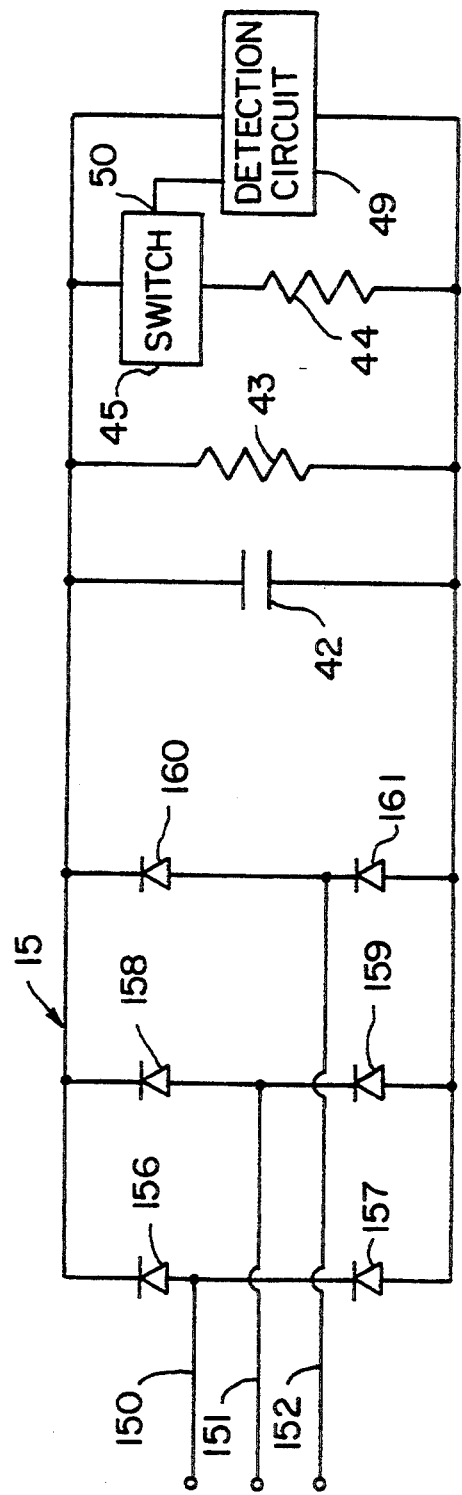
FIG. 11 is a schematic circuit diagram of a three phase stabilizing apparatus in accordance with the invention.

It is understood that the stabilizer apparatus of the invention may be utilized with any type of AC power supply system which might be affected by a power factor correcting load or the like, and is not limited to use with power systems incorporating a transformer. It is also apparent that the present invention may be extended to polyphase power supply systems. An example of a three phase stabilizer in accordance with the invention is illustrated in FIG. 11. The three phase stabilizer has three input lines 150, 151 and 152 which can be connected to the output lines of a three phase AC power supply system (not shown). A three phase load (not shown) is connected to the output lines of the power supply system. The three phase stabilizer has a full wave rectifier 155 comprised of six diodes 156–161 connected in a full bridge configuration to rectify the voltage on the input lines 150–152 and provide a rectified DC voltage on the lines 46 and 47. The stabilizer functions to control the voltage across the lines 46 and 47 in the manner as described above.

It is further understood that the invention is not confined to the particular embodiments set forth herein as illustrative, but embraces such modified forms thereof as come within the scope of the following claims.

What is claimed is:

1. In an AC electrical power system of the type including a power supply providing AC output power on output lines and a power factor correcting load connected to the output lines to receive power from the power supply, the improvement comprising: stabilizing apparatus connected to the output lines in parallel with the load for suppressing instabilities of output power supplied from the power supply to the power factor correcting load, the stabilizing apparatus comprising:

(a) rectifying means, having AC input nodes to which input lines are connected, the input lines connected across the output lines from the AC power supply, for providing unidirectional voltage at DC output nodes when AC voltage is applied to the AC input nodes;

(b) a damping resistor and a capacitor connected in parallel across the output nodes of the rectifying means, with no other load connected to the output nodes, the sizes of the capacitor and resistor selected so that the charge on the capacitor is not substantially dissipated through the resistor between peaks of the waveform of the AC voltage applied to the input nodes and the voltage across the capacitor remains at substantially the zero to peak voltage of the AC voltage, and wherein the capacitor serves to clamp the maximum voltage across the input nodes to a selected voltage level near the steady state AC peak voltage on the power supply system output lines.

2. The apparatus of claim 1 wherein the rectifying means comprises a full wave rectifier.

3. The apparatus of claim 2 wherein the AC power supply system is a single phase system and the full wave rectifier comprises four semiconductor diodes in a bridge configuration.

4. The apparatus of claim 1 wherein the value of the capacitor is selected to be, in microfarads, in the range of 0.3 to 1.87 times the rated load, in volt-amperes, of the power factor corrected load.

5. The apparatus of claim 1 including a controllable switch connected in series with the damping resistor, and means for detecting change in the peak amplitude of the AC voltage applied to the AC input nodes from a steady state level and for controlling the switch to close at a selected level of change to discharge the capacitor through the damping resistor until the voltage across the capacitor reaches the steady state level, and thereafter to open the controllable switch.

6. The apparatus of claim 5 wherein the means for detecting delays closing the controllable switch for a selected period of time after the selected level of change is reached to thereby minimize power dissipation in the damping resistor.

7. The apparatus of claim 5 wherein the means for detecting change adjusts the steady state level at which the controllable switch is closed to match long term changes in the AC voltage level at the input nodes.

8. Stabilizing apparatus for suppressing instabilities of output power supplied from an AC power supply system connected to a power factor correcting load, comprising:

(a) rectifying means, having AC input nodes to which input lines are connected, the input lines connectable across output lines from an AC power supply system, for providing unidirectional voltage at DC output nodes when AC voltage is applied to the AC input nodes;

(b) a damping resistor and a capacitor connected in parallel across the output nodes of the rectifying means, the sizes of the capacitor and resistor selected so that the charge on the capacitor is not substantially dissipated through the resistor between peaks of the waveform of the AC voltage applied to the input nodes and the voltage across the capacitor remains at substantially the zero to peak voltage of the AC voltage, and wherein the capacitor serves to clamp the maximum voltage across the input nodes to a selected voltage level near the steady state AC peak voltage on the power supply system output lines; and (c) an auxiliary damping resistor and a controllable switch connected together in series across the DC output nodes of the rectifying means, and means for detecting change in the peak amplitude of the AC voltage applied to the AC input nodes of the rectifying means from a steady state level, and for controlling the switch to close at a selected level of change to place the auxiliary resistor in parallel with the capacitor and the damping resistor.

9. Stabilizing apparatus for suppressing instabilities of output power supplied from an AC power supply system connected to a load, comprising:

(a) rectifying means, having AC input nodes to which input lines are connected, the input lines connectable across output lines from an AC power supply system, for providing unidirectional voltage at DC output nodes when AC voltage is applied to the AC input nodes;

(b) a damping resistor and a capacitor connected in parallel across the output nodes of the rectifying means, the sizes of the capacitor and resistor selected so that the charge on the capacitor is not substantially dissipated through the resistor between peaks of the waveform of the AC voltage applied to the input nodes, and wherein the capacitor serves to clamp the maximum voltage across the input nodes to a selected voltage level near the steady state AC peak voltage on the power supply system output lines, including an auxiliary damping resistor and a controllable switch connected together in series across the DC output nodes of the rectifying means, and means for detecting change in the peak amplitude of the AC voltage applied to the AC input nodes of the rectifying means from a steady state level, and for controlling the switch to close at a selected level of change to place the auxiliary resistor in parallel with the capacitor and the damping resistor, wherein the capacitor is a main capacitor and the means for detecting change includes a comparator having two inputs, a first of the inputs connected to receive the voltage across the main capacitor, and the second of the inputs connected to a circuit that slowly charges and discharges a reference capacitor from the rectified AC voltage at the input nodes, such that the voltage of the first input of the comparator changes rapidly with changes in the peak voltage of the AC voltage waveform and wherein the voltage applied to the second input of the comparator changes slowly with changes in the peak voltage of the AC input waveform, such that the comparator changes state when the difference between the voltages of successive peaks of the input waveform exceeds a selected level, wherein the comparator is connected to a driver means for driving the controllable switch to turn it on when the comparator changes state.

10. The apparatus of claim 9 wherein the driver means comprises a pulse width modulator which provides an output pulse signal to control the controllable switch and which provides pulses in two different pulse widths, a narrow pulse width when the comparator has not changed state and a wider pulse width when the comparator is in its changed state.

11. The apparatus of claim 10 wherein the controllable switch comprises a power FET.

12. The apparatus of claim 9 wherein the means for detecting change delays closing the controllable switch for a selected period of time after the comparator changes state so that the auxiliary resistor is placed in parallel with the main capacitor after the peak of the input voltage waveform which causes the comparator to change state, thereby minimizing power dissipation in the auxiliary resistor.

13. An improved uninterruptible power supply of the type having a transformer therein with an input winding and an output winding, a battery providing DC voltage, an inverter operable to invert the DC voltage from the battery to an AC voltage applied to the input winding of the transformer, such that the output winding delivers AC power to output lines during a failure of the power from a main power source, the output lines adapted to be connected to a load, the improvement comprising:
  (a) rectifying means, having AC input nodes to which input lines are connected, the input lines connected across the output lines of the power supply and thereby in parallel with a load connected to the output lines, for providing unindirectional voltage at DC output nodes when AC voltage is applied to the AC input nodes; and
  (b) a damping resistor and a capacitor connected in parallel across the output nodes of the rectifying means with no other load connected to the output nodes, the sizes of the capacitor and resistor selected so that the charge on the capacitor is not substantially dissipated through the resistor between peaks of the waveform of the AC voltage applied to the input nodes and the voltage across the capacitor remains at substantially the zero to peak voltage of the AC voltage, and wherein the capacitor serves to clamp the maximum voltage across the input nodes to a selected voltage level near the steady state AC peak voltage on the power supply output lines.

14. The uninterruptible power supply of claim 13 wherein the rectifying means comprises a full wave rectifier.

15. The uninterruptible power supply of claim 14 wherein the power supply is single phase and the full wave rectifier comprises four semiconductor diodes in a bridge configuration.

16. The uninterruptible power supply of claim 13 wherein the transformer is a ferroresonant transformer.

17. The uninterruptible power supply of claim 13 wherein the transformer is a linear transformer.

18. An improved uninterruptible power supply of the type having a transformer therein with an input winding and an output winding, a battery providing DC voltage, an inverter operable to invert the DC voltage from the battery to an AC voltage applied to the input winding of the transformer, such that the output winding delivers AC power to output lines during a failure of the power from a main power source, the output lines adapted to be connected to a load such as a power factor correcting load, the improvement comprising:
  (a) rectifying means, having AC input nodes to which input lines are connected, the input lines connected across the output lines of the power supply, for providing unindirectional voltage at DC output nodes when AC voltage is applied to the AC input nodes;
  (b) a damping resistor and a capacitor connected in parallel across the output nodes of the rectifying means, the sizes of the capacitor and resistor selected so that the charge on the capacitor is not substantially dissipated through the resistor between peaks of the waveform of the AC voltage applied to the input nodes and the voltage across the capacitor remains at substantially the zero to peak voltage of the AC input voltage, and wherein the capacitor serves to clamp the maximum voltage across the input nodes to a selected voltage level near the steady state AC peak voltage on the power supply output lines; and
  an auxiliary damping resistor and a controllable switch connected in series across the DC output nodes of the rectifying means, and means for detecting change in the peak amplitude of the voltage applied to the AC input nodes of the rectifying means from a steady state level and for controlling the switch to close at a selected level of change to place the auxiliary resistor in parallel with the capacitor and the damping resistor.

19. An improved uninterruptible power supply of the type having a transformer therein with an input winding and an output winding, a battery providing DC voltage, an inverter operable to invert the DC voltage from the battery to an AC voltage applied to the input winding of the transformer, such that the output winding delivers AC power to output lines during a failure of the power from a main power source, the output lines adapted to be connected to a load, the improvement comprising:
  (a) rectifying means, having AC input nodes to which input lines are connected, the input lines connected across the output lines of the power supply, for providing unindirectional voltage at DC output nodes when AC voltage is applied to the AC input nodes; and
  (b) a damping resistor and a capacitor connected in parallel across the output nodes of the rectifying means, the sizes of the capacitor and resistor selected so that the charge on the capacitor is not substantially dissipated through the resistor between peaks of the waveform of the AC voltage applied to the input nodes, and wherein the capacitor serves to clamp the maximum voltage across the input nodes to a selected voltage level near the steady state AC peak voltage on the power supply output lines, including an auxiliary damping resistor and a controllable switch connected in series across the DC output nodes of the rectifying means, and means for detecting change in the peak amplitude of the voltage applied to the AC input nodes of the rectifying means from a steady state level and for controlling the switch to close at a selected level of change to place the auxiliary resistor in parallel with the capacitor and the damping resistor, wherein the capacitor is a main capacitor and the means for detecting change includes a comparator having two inputs, a first of the inputs connected to receive the voltage across the main capacitor, and the second of the inputs connected to a circuit that slowly charges and discharges a reference capacitor from the rectified AC voltage at the input nodes, such that the voltage of the first input of the comparator changes rapidly with changes in the peak voltage of the AC voltage waveform and wherein the voltage applied to the second input of the comparator changes slowly with changes in the peak voltage of the AC input waveform, such that the comparator changes state when the difference between the voltages of successive peaks of the input waveform exceeds a selected level, wherein the comparator is connected to a driver means for driving the controllable switch to close it when the comparator changes state.

20. The uninterruptible power supply of claim 19 wherein the driver means comprises a pulse width modulator which provides an output pulse signal to control the controllable switch and which provides pulses in two different pulse widths, a narrow pulse width when the comparator has not changed state and a wider pulse width when the comparator is in its changed state.

21. The uninterruptible power supply of claim 19 wherein the means for detecting change delays closing the controllable switch for a selected period of time after the comparator changes state so that the auxiliary resistor is placed in parallel with the main capacitor after the peak of the input voltage waveform which causes the comparator to change state, thereby minimizing power dissipation in the auxiliary resistor.

22. An improved uninterruptible power supply of the type having a transformer therein with An input winding and an output winding, a battery providing DC voltage, an inverter operable to invert the DC voltage from the battery to an AC voltage applied to the input winding of the transformer, such that the output winding delivers AC power to output lines during a failure of the Dower from a main power source, the output lines adapted to be connected to a load, the improvement comprising:
   (a) rectifying means, having AC input nodes to which input lines are connected, the input lines connected across the output lines of the power supply and thereby in parallel with a load connected to the output lines, for providing unindirectional voltage at DC output nodes when AC voltage is applied to the AC input nodes; and
   (b) a damping resistor and a capacitor connected in parallel across the output nodes of the rectifying means, the sizes of the capacitor and resistor selected so that the charge on the capacitor is not substantially dissipated through the resistor between peaks of the waveform of the AC voltage applied to the input nodes and the voltage across the capacitor remains at substantially the zero to peak voltage of the AC voltage, and wherein the capacitor serves to clamp the maximum voltage across the input nodes to a selected voltage level near the steady state AC peak voltage on the power supply output lines, wherein the power supply has a rated load for power to be supplied by the power supply, and wherein the value of the capacitor, in microfarads, is selected to be in the range of 0.3 to 1.87 times the rated load, in volt-amperes.

23. An improved uninterruptible power supply of the type having a transformer therein with an input winding and an output winding, a battery providing DC voltage, an inverter operable to invert the DC voltage from the battery to an AC voltage applied to the input winding of the transformer, such that the output winding delivers AC power to output lines during a failure of the power from a main power source, the output lines adapted to be connected to a load, the improvement comprising:
   (a) rectifying means, having AC input nodes to which input lines are connected, the input lines connected across the output lines of the power supply and thereby in parallel with a load connected to the output lines, for providing unindirectional voltage at DC output nodes when AC voltage is applied to the AC input nodes; and
   (b) a damping resistor and a capacitor connected in parallel across the output nodes of the rectifying means, the sizes of the capacitor and resistor selected so that the charge on the capacitor is not substantially dissipated through the resistor between peaks of the waveform of the AC voltage applied to the input nodes and the voltage across the capacitor remains at substantially the zero to peak voltage of the AC voltage, and wherein the capacitor serves to clamp the maximum voltage across the input nodes to a selected voltage level near the steady state AC peak voltage on the power supply output lines, wherein the power supply has a rated load for power to be supplied by the power supply, and wherein the damping resistor connected in parallel with the capacitor provides an additional load of about 1% of the rated load for the uninterruptible power supply.

24. An improved uninterruptible power supply of the type having a transformer therein with an input winding and an output winding, a battery providing DC voltage an inverter operable to invert the DC voltage from the battery to an AC voltage applied to the input winding of the transformer, such that the output winding delivers AC power to output lines during a failure of the power from a main power source, the output lines adapted to be connected to a load, the improvement comprising:
   (a) rectifying means, having AC input nodes to which input lines are connected, the input lines connected across the output lines of the power supply and thereby in parallel with a load connected to the output lines, for providing unindirectional voltage at DC output nodes when AC voltage is applied to the AC input nodes; and
   (b) a damping resistor and a capacitor connected in parallel across the output nodes of the rectifying means, the sizes of the capacitor and resistor selected so that the charge on the capacitor is not substantially dissipated through the resistor between peaks of the waveform of the AC voltage applied to the input nodes and the voltage across the capacitor remains at substantially the zero to peak voltage of the AC voltage, and wherein the capacitor serves to clamp the maximum voltage across the input nodes to a selected voltage level near the steady state AC peak voltage on the power supply output lines, and further including a controllable switch connected in series with the damping resistor, and means for detecting change in the peak amplitude of the AC voltage applied to the AC input nodes from a steady state level and for controlling the switch to close at a selected level of change to discharge the capacitor through the damping resistor until the voltage across the capacitor reaches the steady state level, and thereafter to open the controllable switch.

25. The uninterruptible power supply of claim 24 wherein the means for detecting change delays closing of the controllable switch for a selected period of time after the selected level of change is reached to thereby minimize power dissipation in the damping resistor.

26. The uninterruptible power supply of claim 24 wherein the means for detecting change adjusts the steady state level at which the controllable switch is closed to match long term changes in the AC voltage level at the input nodes.

27. A method of stabilizing the output power from an AC power supply system which is provided on output lines which are connected to a power factor correcting load, the power supply system providing a sinusoidal voltage waveform with positive and negative peaks during each cycle of the waveform, comprising the steps of:
   (a) connecting a rectifier across the output lines, the rectifier having DC output nodes at which full wave rectified DC voltage appears when AC voltage is applied to AC input nodes of the rectifier;
   (b) charging up a capacitor connected across the output nodes of the rectifier from AC voltage provided from the power supply system and rectified by the rectifier, the capacitor being charged to a peak value near the steady state peak value of the waveform of the AC voltage applied to the rectifier;
   (c) clamping the peak voltage of the AC voltage waveform applied to the rectifier to a level near the voltage of the charged capacitor by diverting current from the power supply through the rectifier and the capacitor when the voltage on the output lines exceeds the voltage on the capacitor; and
   (d) dissipating the energy stored in the capacitor through a resistor connected in parallel with the capacitor and with no other load connected to the capacitor to maintain the voltage on the capacitor near the steady state zero to peak value of the waveform of the AC voltage applied to the rectifier during the time between one peak and the next peak of the full wave rectified DC voltage at the DC output nodes of the rectifier.

28. The method of claim 27 including the further steps of detecting when changes in the peak AC voltage from the power supply occur which exceed a selected level, and when such changes occur, connecting a damping resistor in parallel with the capacitor until the voltage on the capacitor reaches the steady state level.

29. Stabilizing apparatus for suppressing instabilities of output power from an AC power supply system connected to a power factor correcting load, comprising:
   (a) rectifying means, having AC input nodes to which input lines are connected, the input lines connectable across output lines from an AC power supply system, for providing unidirectional voltage at DC output nodes when AC voltage is applied to the AC input nodes;
   (b) controlled power dissipation means, including a main capacitor connected across the DC output nodes of the rectifying means, for limiting the peak voltage across the DC output nodes to substantially the zero to peak value of the steady state AC voltage applied to the input nodes of the rectifying means and maintaining the voltage across the capacitor at substantially the zero to peak voltage between peaks of the AC voltage, and when changes of the peak values of the AC voltage applied to the input nodes from the steady state level occurs, for dissipating power between peaks of the AC voltage waveform, wherein the controlled power dissipation means includes a resistor connected in parallel with the main capacitor across the output nodes of the rectifying means.

30. The apparatus of claim 29 wherein the rectifying means comprises a full wave rectifier.

31. Stabilizing apparatus for suppressing instabilities of output power from an AC power supply system connected to a power factor correcting load, comprising:
   (a) rectifying means, having AC input nodes to which input lines are connected, the input lines connectable across output lines from an AC power supply system, for providing unidirectional voltage at DC output nodes when AC voltage is applied to the AC input nodes;
   (b) controlled power dissipation means, including a main capacitor connected across the DC output nodes of the rectifying means, for limiting the peak voltage across the DC output nodes to substantially the zero to peak value of the steady state AC voltage applied to the input nodes of the rectifying means and maintaining the voltage across the capacitor at substantially the zero to peak voltage between peaks of the AC voltage, and when changes of the peak values of the AC voltage applied to the input nodes from the steady state level occurs, for dissipating power between peaks of the AC voltage waveform, and wherein the controlled power dissipation means includes a damping resistor and a controllable switch connected together in series across the output nodes of the rectifying means and in parallel with the main capacitor, and including means for detecting change in the peak amplitude of the AC voltage applied to the input nodes of the rectifying means and for controlling the switch to close when a selected level of change from a steady state level occurs to dissipate energy through the damping resistor to discharge the main capacitor.

32. The apparatus of claim 31 wherein a main resistor is connected in parallel with the main capacitor and the resistor connected in series with the controllable switch is an auxiliary resistor which is connected in parallel with the main resistor when the controllable switch is closed.

33. The apparatus of claim 31 wherein the controllable switch comprises a power FET.

34. Stabilizing apparatus for suppressing instabilities of output power from an AC power supply system connected to a load, comprising:
   (a) rectifying means, having AC input nodes to which input lines are connected, the input lines connectable across output lines from an AC power supply system, for providing unidirectional voltage at DC output nodes when AC voltage is applied to the AC input nodes;
   (b) controlled power dissipation means, including a main capacitor connected across the DC output nodes of the rectifying means, for limiting the peak voltage across the DC output nodes to substantially the zero to peak value of the steady state AC voltage applied to the input nodes of the rectifying means, and when changes of the peak values of the AC voltage applied to the input nodes from the steady state level occurs, for dissipating power between peaks of the AC voltage waveform, wherein the controlled power dissipation means includes a damping resistor and a controllable switch connected together in series across the output nodes of the rectifying means and in parallel with the main capacitor, and including means for detecting change in the peak amplitude of the AC voltage applied to the input nodes of the rectifying means and for controlling the switch to close when a selected level of change from a steady state level occurs to dissipate energy through the damping resistor to discharge the main capacitor, and wherein the means for detecting change includes a comparator having two inputs, a first of the inputs connected to receive the voltage across the main capacitor, and the second of the inputs connected to a circuit that slowly charges and discharges a reference capacitor from the rectified AC voltage at the input nodes, such that the voltage of the first input of the comparator changes rapidly with changes in the peak voltage of the AC voltage waveform and wherein the voltage applied to the second input of the comparator changes slowly with changes in the peak voltage of the AC input waveform, such that the comparator changes state when the difference between the voltages of successive peaks of the input waveform exceeds a selected level, wherein the comparator is connected to a driver means for driving the controllable switch to close it when the comparator changes state.

35. The apparatus of claim 34 wherein the driver means comprises a pulse width modulator which provides an output pulse signal to control the controllable switch and which provides pulses in two different pulse widths, a narrow pulse width when the comparator has not changed state and a wider pulse width when the comparator is in its changed state.

36. The apparatus of claim 34 wherein the means for detecting change delays closing of the controllable switch for a selected period of time after the comparator changes state so that the resistor is placed in parallel with the main caparator after the peak of the input voltage waveform which causes the comparator to change state, thereby minimizing power dissipation in the resistor.

* * * * *